United States Patent [19]

Shahid

[11] Patent Number: 5,613,024
[45] Date of Patent: Mar. 18, 1997

[54] ALIGNMENT OF OPTICAL FIBER ARRAYS TO OPTICAL INTEGRATED CIRCUITS

[75] Inventor: Muhammed A. Shahid, Ewing Township, N.J.

[73] Assignee: Lucent Technologies Inc., Murray Hill, N.J.

[21] Appl. No.: 576,142

[22] Filed: Dec. 21, 1995

[51] Int. Cl.$^6$ .................................... G02B 6/26
[52] U.S. Cl. ............................................ 385/52
[58] Field of Search ........................ 385/50, 51, 52, 385/65, 83, 147

[56] References Cited

U.S. PATENT DOCUMENTS

| | | | |
|---|---|---|---|
| 4,762,387 | 8/1988 | Batdorf et al. | 385/71 |
| 4,830,456 | 5/1989 | Kakii et al. | 385/75 |
| 4,950,048 | 8/1990 | Kakii et al. | 385/83 |
| 5,394,498 | 2/1995 | Hinterlong et al. | 385/115 |
| 5,446,810 | 8/1995 | Watanabe et al. | 385/137 |
| 5,450,508 | 9/1995 | DeCusatis et al. | 385/25 |
| 5,519,799 | 5/1996 | Murakami et al. | 385/78 |

*Primary Examiner*—Akm E. Ullah

[57] ABSTRACT

The specification describes a connector assembly for interconnecting lightwave waveguide arrays to lightwave fiber arrays. It uses passive alignment means in the form of grooves and pins. The grooves and pins are formed in a precise dimensional relationship with the light path in the two halves of the assembly so that when the pins are inserted into the v-grooves the lightguides align precisely.

17 Claims, 3 Drawing Sheets

ALIGNMENT OF OPTICAL FIBER ARRAYS TO OPTICAL INTEGRATED CIRCUITS

FIELD OF THE INVENTION

The invention relates to interconnection devices and techniques for attaching optical fiber arrays to corresponding arrays in optical integrated circuits.

BACKGROUND OF THE INVENTION

With continuing advances in lightwave technology the cost of lightwave devices like optical integrated circuits has declined but dramatic cost reductions, as have been experienced in other integrated circuit technologies, have been slow in coming. A major reason for the high cost of these devices is that the interconnection of active devices with input/output connectors has remained persistently costly due to the high precision alignment required between the input/output element—typically an optical fiber—and the lightguide region of the active device. The core dimension of the fiber, typically less than ten microns, must be precisely aligned to a correspondingly small window of the optical device. The problem is compounded in edge emitting laser devices and optical integrated circuits which typically are thin film devices with the waveguides in the device terminating at the edge of the thin film. The fiber or fiber array must be butted to the waveguides on the edge of the device with the kind of precision just mentioned. Most solutions to this problem that have been proposed or are in use require manual assembly operations and alignment monitoring tools. In this approach interconnections are made using active manipulation to empirically achieve satisfactory alignment. Active alignment is the major cost element referred to above. A variety of passive alignment schemes have been proposed for making these awkward interconnection but low cost precision interconnection between fiber arrays and optical integrated circuits still demands more cost effective solutions, in particular, passive alignment solutions.

STATEMENT OF THE INVENTION

I have developed a passive alignment technique for interconnecting linear precision fiber arrays with thin film optical integrated circuits. The technique relies on an interconnection with alignment means precision formed into the interconnection assembly. The interconnection assembly relies on v-groove technology using crystallographic anisotropic etching of silicon v-groove members and alignment dowels to form precision molds. The molds are used to injection mold high precision plastic connectors in which pins that align the mating parts of the connector have been prealigned with both the fiber array and the waveguide array.

DETAILED DESCRIPTION

Figure 1:
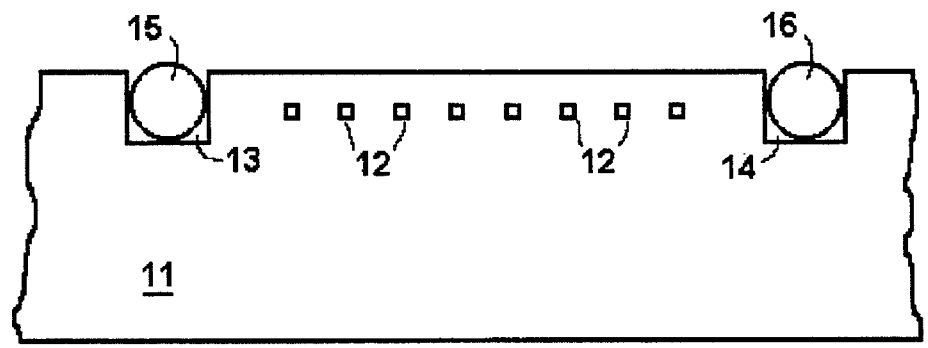
FIG. 1 is a section through the optical integrated circuit showing a linear waveguide array and one set of alignment pins.

With reference to FIG. 1 the optical integrated circuit 11 is shown with a linear array of waveguides 12. The part shown is the end or edge of the integrated circuit. The waveguides can be $SiO_2$ on silicon, waveguides in lithium niobate, etc., and the optical integrated circuit can be associated with a modulator, switch, multiplexer, etc. The waveguides are typically formed with precise spacing and depth. The mating fiber array can also be produced with corresponding precision. However, connecting the fiber array to the waveguide array typically requires elaborate alignment tools and a manual alignment operation. I avoid these by incorporating a precision alignment device on both mating pieces of the connector. The alignment mechanism on the waveguide array connector part consists of two alignment channels 13 and 14 formed into the substrate. Alignment pins 15 and 16 are fixed in the alignment channels as shown. The centerline of the alignment channels, and thus the centerline of the alignment pins, lies precisely in the plane of the centers of the waveguides 12 in the waveguide array. Centering of the pins on the center plane of the fiber array can be achieved by adjusting the depth of the channels 13 and 14 or by selection of the diameter of the pins 15 and 16. The depth of the alignment channels can be precisely determined in many cases by close control over the etching process used to form the grooves. For example, in silicon technology if the waveguides are formed of $SiO_2$ over silicon, the $SiO_2$ layer can be lithographically masked and etched by RIE or other known techniques to form channels with precise dimensions and in particular, precise depth. The depth can also be adjusted, after initial etching, by depositing metal into the channels.

A variety of choices are available for the material of connector pins 15 and 16. They can be metal such as stainless steel. However, differential thermal expansion between metal pins and the substrate material, or between metal pins and the molded plastic of the mating part, makes ceramic or plastic pins a better choice. The pins can be fixed permanently into one or both of the mating parts by adhesive such as epoxy, or can be removable from one of the parts to facilitate disconnection and reconnection. Typically, the pins are epoxied to both parts of the connector and the connector put in a protective package.

Figure 2:
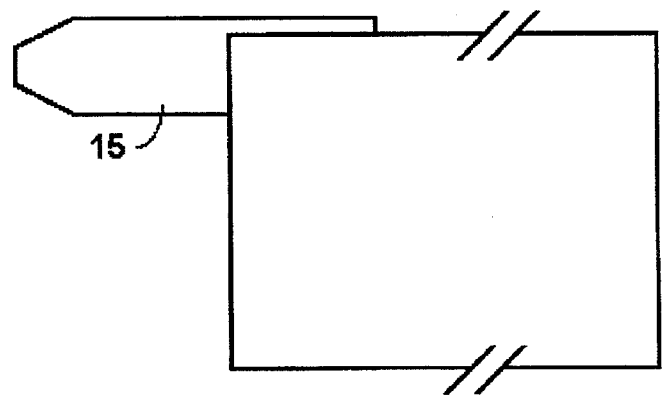
FIG. 2 is a side elevation of FIG. 1.

A side elevation of the connector part of FIG. 1 is shown in FIG. 2. The connector pins 16 (and 15, not visible) protrude from the waveguide array as shown.

Figure 3:
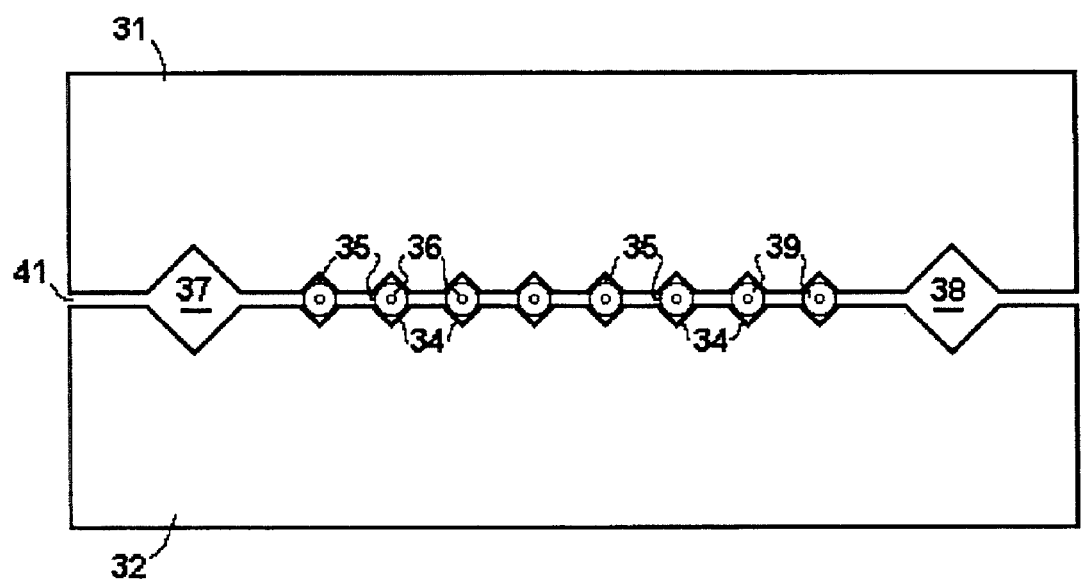
FIG. 3 is a section through the linear fiber array showing the mating piece of the connector of the invention.

The mating part of the connector is shown in FIG. 3. This part holds the fiber array. It comprises generally two mating blocks 31 and 32, each with an array of v-grooves 34. The blocks may be injected molded of an appropriate plastic, such highly filled polyphenylene sulfide (PPS). Injection molding of these parts is a cost effective approach. Alternatively, the blocks may be silicon substrates with v-grooves etched by anisotropic crystallographic etchants such as KOH or ethylene diamine pyrocatechol. In the case of injection molded blocks, the molds for the v-groove blocks may be made using the silicon v-groove technology just mentioned.

For more details on forming v-groove members see my copending application Ser. No. 08/516,473 filed Aug. 17, 1995. The v-grooves 34 contain a linear array of eight fibers 35. The fibers are typical fiber waveguides with cores 36 and cladding 39. When assembled in the array the fibers are aligned in precise spatial relationship so that the cores 36 of the fibers are aligned in a plane corresponding to the intersection of the mating v-blocks 31 and 32. For purposes of this description this plane will be termed the fiber core plane.

Alignment grooves 37 and 38 are formed along the edges of blocks 31 and 32 as shown. The alignment grooves are shown as v-grooves and can be made by the same techniques used to form the smaller v-grooves 34. The grooves may be formed by other processes and may also have other shapes. For example they may have rectangular shapes similar to those of grooves 13 and 14 of FIG. 1. When the blocks 31 and 32 are assembled together as shown in the figure the grooves form elongated sleeves 37 and 38. If the grooves are v-shaped the sleeves will have a diamond shaped cross section, or if the sidewalls of the grooves are at 45 degrees, a square cross section. If the grooves are formed by molds made using crystallographic etching of silicon, the cross section of the sleeves will be diamond shaped. As indicated earlier, other shapes may also be used. If the grooves are formed by anisotropic RIE for example, they will be rectangular in shape and the cross section of the sleeves 37, 38 will be square or rectangular. The essential requirement of these grooves is similar to that of the mating part of FIG. 1, i.e. the precise centerline of the sleeves 37 and 38, and thus the precise centerline of an alignment rod or pin inserted in these alignment sleeves, must align precisely with the fiber core plane. This is conveniently achieved by making the mating blocks with the same dimensions, e.g. by using the same injection mold, or different molds made from the same master mold. If the blocks themselves are silicon blocks, as mentioned before, the alignment grooves 37, 38 can be made using the v-groove crystallographic etch technique also mentioned before. In either case, i.e. the blocks are silicon made with v-groove etch technology, or are molded from mold parts made using v-groove etch technology, the dimensions of the v-groove can be controlled very precisely, i.e. to <0.2 μm. Similar dimensional control results from the lithographic technique mentioned before and, although it involves greater expense, even the smaller grooves that carry the optical fiber array can be made using this approach. In that case, of course, the grooves will normally be U-shaped.

The blocks 31 and 32 are typically fastened together with an adhesive, e.g. epoxy. In bonding the blocks 31 and 32 together it may be convenient to insert an alignment dowel in the v-grooves 37 and 38 as a temporary alignment means during the bonding operation. This ensures that the v-grooves on each of the mating parts are precisely aligned. The alignment dowel may then be removed. Alternatively it may be convenient to use a short alignment dowel in this step of the assembly, and leave it in place after bonding. In such a case the alignment dowel would extend short of the end faces of the blocks to keep a sufficient portion of the v-groove free to engage pins 15 and 16o However, experience has shown that the fibers usually provide sufficient alignment during assembly that additional alignment precautions are unnecessary.

The blocks 31 and 32 are usually designed with the widest spacing of the v-grooves 34 slightly smaller than the diameter of the fiber coating 39. This allows some compression of the fibers 38 so that the fiber retaining grooves 34 grip the fibers. As a result, a small gap 40 typically remains between the blocks 31 and 32 after the connector part is assembled. That gap is accounted for in sizing the alignment grooves 37 and 38 and the alignment pins 15 and 16 in the mating part 11 shown in FIGS. 1 and 2.

Figure 4:
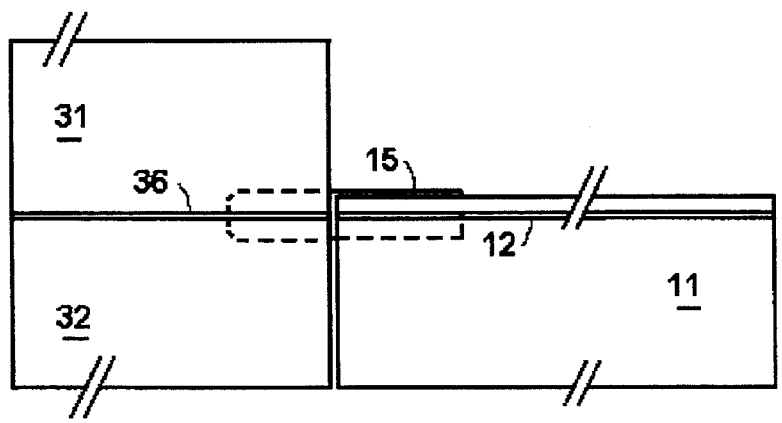
FIG. 4 shows a schematic view of the connector parts of FIGS. 1 and 3 interconnected.

After polishing the fiber array the two connector parts may be assembled together by sliding the alignment pins 15 and 16 of the waveguide array into the alignment grooves 37 and 38 of the fiber array. The resulting interconnected assembly is shown schematically in FIG. 4. For clarity, the lightguide path, i.e. the fiber cores 36 and the waveguides 12 appear in the figure but the v-grooves do not. The remaining elements are designated by the same reference numbers as in FIG. 1–3. Upon assembly, the two parts may be epoxied, cured and put into a protective package.

In some cases it may not be possible or convenient to form grooves into the integrated circuit surface, i.e. like those shown at 13 and 14 in FIG. 1. For example, optical integrated circuits are frequently formed in lithium niobate crystals and lithium niobate is more difficult to etch with precision that $SiO_2$ as just described. Moreover, the waveguides in some integrated circuits may be formed at or very near the surface of the substrate. In such cases the embodiment of the invention shown in FIGS. 1–3 may not be the most desirable approach. An alternative that may be more suitable in these cases is shown in FIGS. 5 and 6.

Figure 5:
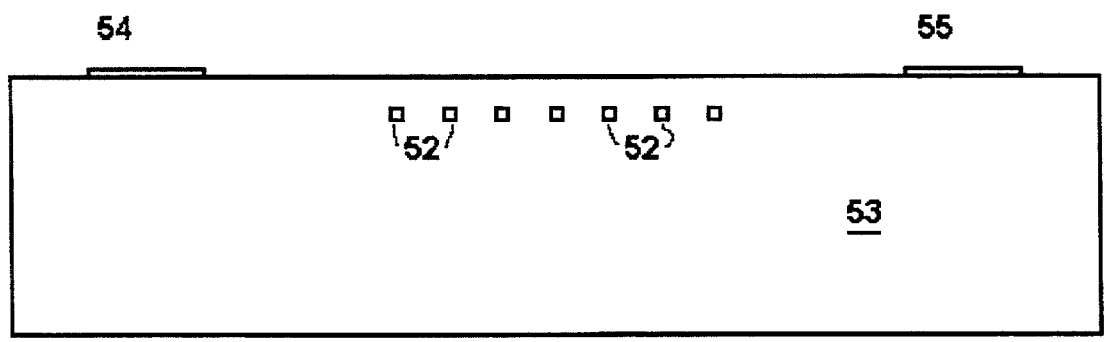
FIG. 5 shows a section similar to that of FIG. 1 showing an alternative embodiment of the invention.
Figure 6:
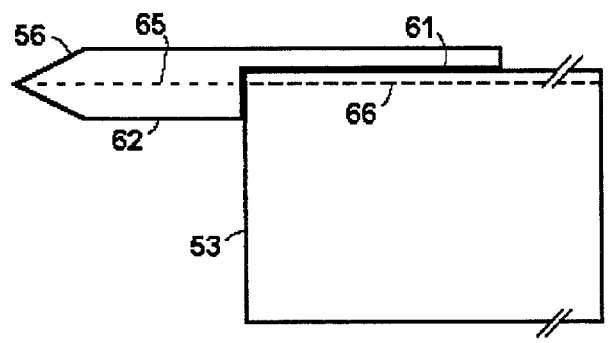
FIG. 6 is a schematic section of the device of FIG. 5 showing the alignment pin bonded to the integrated optical circuit connector part.

Referring first to FIG. 5 there is shown an optical integrated circuit shown generally at 51, with a linear array of waveguides 52 formed within substrate 53. In this embodiment, metallization (bonding) pads, or solder bumps, 54 and 55 are formed at the edges of the substrate as shown. The alignment pins in this embodiment, 56 and 57, are designed as shown in FIG. 6, which is a side view of one of the alignment pins (56) bonded to the substrate 53. The pins are designed with a flat facet 61 along a portion of the length of each pin. The faceted portions of the pins are bonded to the bonding pads 54 and 55 of FIG. 5 and the remaining portion, the whole round 62, extends from the end of the substrate 53 as shown in FIG. 6. This whole round portion functions in the same way as the pins 15 and 16 in FIGS. 1 and 4 when inserted into the grooves 37, 38. The key feature is to have the centerline of the faceted pin 56, indicated by the short dashed line 65 in FIG. 6, in precise alignment with the plane of the center of waveguides 52, indicated by the long dashed line at 66 in FIG. 6. This is achieved by precise control over the radial distance between the centerline of the pins 65 and the plane of the facets 61. That radial distance must be equal to the distance the center 66 of waveguides are recessed below the surface of the substrate 53. With that condition met, the waveguide array with pins 56 extending as shown in FIG. 6 is adapted to be inserted into the mating fiber array part shown in FIG. 3.

Figure 7:
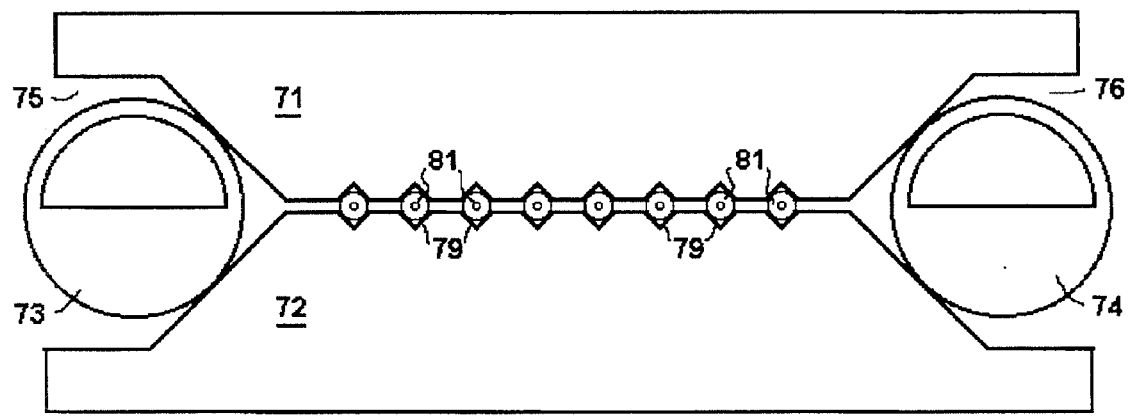
FIG. 7 shows the fiber array half of the connector and the alignment means used in this embodiment.
Figure 8:
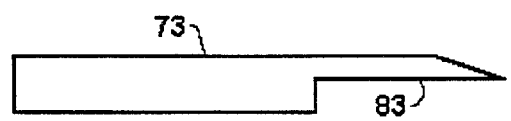
FIG. 8 is a left side elevation of the alignment pin shown in FIG. 7.

An alternative mating part for the waveguide integrated circuit of FIG. 5 is shown in FIG. 7. Here the fibers are fixed in mating v-groove support blocks 71 and 72 in the same manner as shown in FIG. 3 but the blocks are joined together with two alignment pins 73 and 74 as shown. The edges of the mating blocks 71 and 72 form large, essentially v-shaped, grooves 75, 76 when assembled together. The blocks are held together with spring clips (not shown). Alternatively the assembly shown in FIG. 7 can be bonded together with an adhesive such as epoxy. The alignment pins 73 and 74 establish both the vertical spacing and alignment of the blocks 71, 72 but also the correct horizontal alignment of the v-grooves 79 carrying the linear array of fibers 81. The alignment pins 73 and 74 have a beveled portion 83 as shown in the left side view of pin 73 in FIG. 8. This embodiment will be recognized as nearly the equivalent of the embodiment shown in FIGS. 5 and 6 except that the faceted alignment pins are part of the fiber array assembly rather than the waveguide assembly. The faceted pins 73, 74 perform an alignment and retaining function for the fiber array in the embodiment of FIG. 7.

Yet another alternative connector part is represented by the structure of FIG. 7 but with the alignment pins 73 and 74 whole, i.e. not beveled. In that case the part of FIG. 7 is adapted to be mated with the part shown in FIG. 3 and that combination is regarded as an alternative interconnection according to the invention.

In the embodiments described so far the alignment means are located along the outer edges of the substrate with the array of waveguides or the fiber array located in between. The arrangement is logical and convenient but other configurations may be equally useful.

The invention has been described in terms of interconnecting an array of fibers to an array of lightguides in an optical integrated circuit. There may be applications in which either half of the connector part described is advantageously connected to another form of lightguide array, or two optical integrated circuits are to be interconnected. Accordingly the invention may be viewed as involving either the aforedescribed fiber array connector, or the optical integrated circuit connector, or the combination of the two. The term array is meant to suggest at least two members.

Also it will be evident that the alignment pins used to interconnect two of the mating parts described here are part of the final interconnection when the parts are assembled together, i.e. the pins are not necessarily associated with one part or the other. Thus, while FIG. 3 shows the alignment pins fixed within the waveguide array part for insertion into the fiber array part, it can just as easily be initially fixed into the fiber array part for insertion into the waveguide array part.

Various additional modifications of the invention as described above will become apparent to those skilled in the art. All such deviations of the invention or equivalents thereof that basically rely on the teachings through which this invention has advanced the art are properly considered within the scope of this invention as already described and as claimed in the appended claims.

I claim:

1. A fiber array connector part adapted to be connected to a lightguide array comprising:

a first substrate containing a series of parallel fiber support grooves formed into the surface of the substrate and a pair of alignment grooves also formed into the surface of the substrate and extending parallel to said fiber support grooves, a second substrate having essentially the same structure as the first substrate, and a series of optical fibers contained in the fiber support grooves with the centers of the optical fibers lying in a fiber array plane that is parallel to the surface of the substrate, said first and second substrates being assembled together so that the optical fibers lie within mating support grooves, and said alignment grooves mate together to form an alignment sleeve with the precise center of the sleeve lying in the said fiber array plane.

2. The connector part of claim 1 in which the fiber support grooves are v-shaped in cross section.

3. The connector part of claim 2 in which the substrates are injection molded.

4. The connector part of claim 3 in which the substrates are injection molded from the same injection mold.

5. The connector part of claim 3 in which the substrates are identical in shape.

6. The connector part of claim 4 in which the substrates are injection molded using molds in which the v-grooves are made by crystallographic v-groove etching of single crystal silicon.

7. An optical integrated circuit connector part comprising:

an optical integrated circuit formed in a substrate, said circuit comprising a array of parallel waveguides formed at or beneath the surface of said substrate, with the center of said waveguides forming a plane located beneath the surface of said substrate, said array of waveguides extending to and terminating at one edge of said substrate, and a pair of alignment channels formed into the surface of the substrate, said alignment channels extending parallel to the waveguide array and terminating at the edge of the substrate, and said alignment channels having a centerline that lies in the said waveguide plane.

8. The connector part of claim 7 further including a pair of elongated cylindrical alignment pins located in said alignment channels with the centerline of the alignment pins lying in said waveguide plane, said alignment pins having a length that extends past the edge of said substrate.

9. The connector part of claim 8 in which the alignment pins are adapted to engage the alignment sleeves of the connector part of claim 1.

10. A lightguide connector assembly in which the connector part of claim 1 is connected to the connector part of claim 8 and said alignment pins of the connector part of claim 8 are inserted into the alignment sleeves of the connector part of claim 1.

11. An optical integrated circuit connector part comprising:

an optical integrated circuit formed in a substrate, said circuit comprising a array of parallel waveguides formed at or beneath the surface of said substrate, with the center of said waveguides forming a plane located beneath the surface of said substrate, said array of waveguides extending to and terminating at one edge of said substrate, and a pair of alignment strips formed on the surface of the substrate, said alignment strips extending parallel to the waveguide array and formed of a bonding material.

12. An optical integrated circuit connector part comprising:

an optical integrated circuit formed in a substrate, said circuit comprising a array of parallel waveguides formed at or beneath the surface of said substrate, with the center of said waveguides forming a plane located beneath the surface of said substrate, said array of waveguides extending to and terminating at one edge of said substrate, and a pair of alignment strips formed on the surface of the substrate, said alignment strips extending parallel to the waveguide array and formed of a bonding material, and a pair of alignment pins bonded to said alignment strips, said alignment pins each having a centerline lying precisely in the plane of the waveguide array.

13. A fiber array connector part adapted to be connected to a lightguide array comprising:

a first rectangular shaped substrate having a major surface plane and two major edge planes, said major surface plane containing a series of parallel v-groove fiber supports formed into the surface of the substrate and said two major edge planes having alignment grooves formed into their surface and extending parallel to said v-groove fiber supports, a second substrate having essentially the same structure as the first substrate, and a series of optical fibers contained in the v-grooves fiber supports with the centers of the optical fibers lying in a fiber array plane that is parallel to the surface of the substrate, said first and second substrates being assembled together so that the optical fibers lie within mating v-grooves, and said alignment grooves mate together to form a v-shaped alignment sleeve with the precise center of the sleeve lying in the said fiber array plane.

14. The connector part of claim 13 further including a pair of alignment pins fixed in said alignment grooves with the centerline of said alignment pins lying precisely in said fiber array plane.

15. A lightwave connector assembly comprising the connector part of claim 11 interconnected to the connector part of claim 12.

16. A lightwave connector assembly comprising the connector part of claim 11 interconnected to the connector part of claim 13.

17. A lightwave connector assembly comprising the connector part of claim 7 interconnected to the connector part of claim 13.

* * * * *